UNITED STATES PATENT OFFICE.

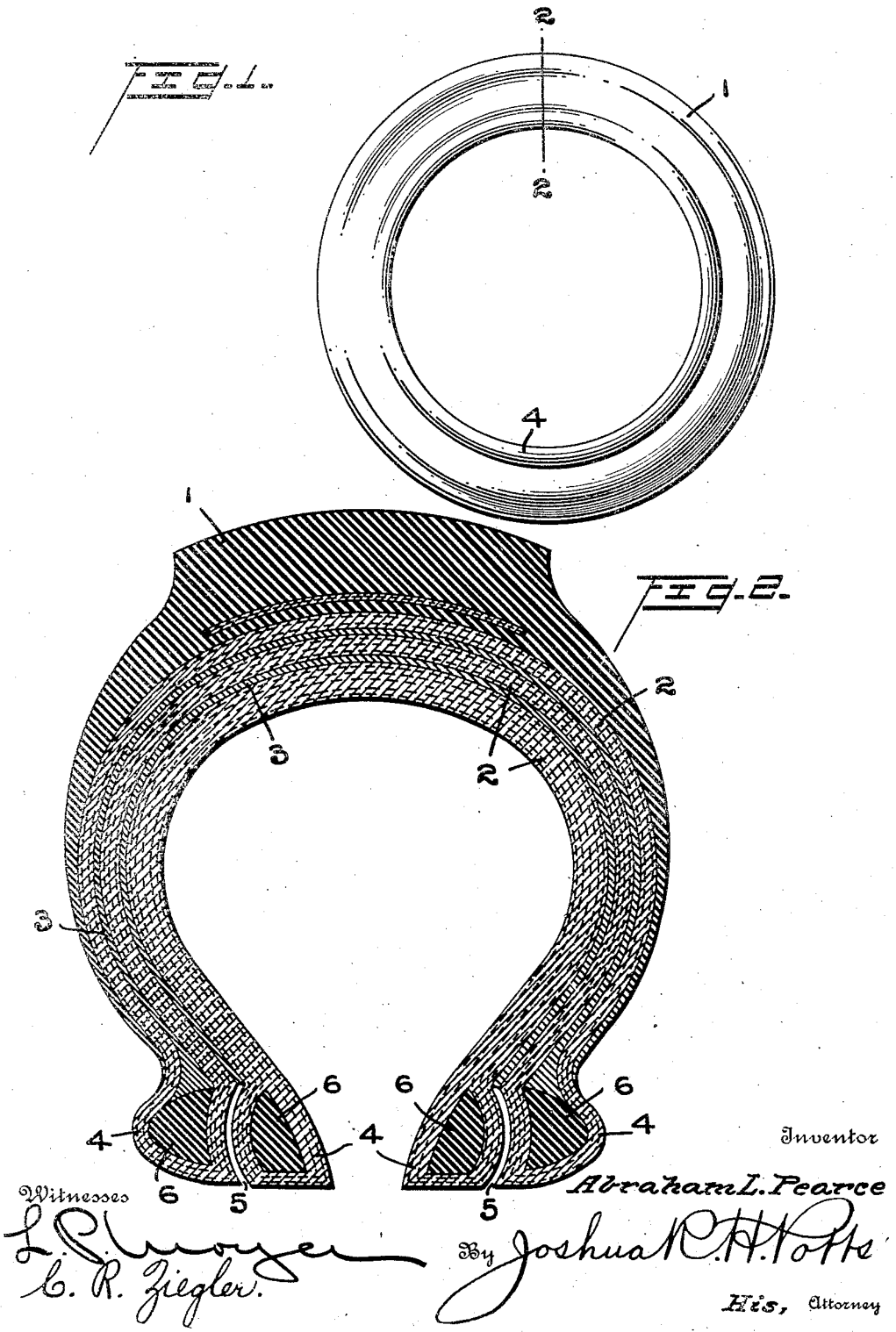

ABRAHAM LINCOLN PEARCE, OF PHILADELPHIA, PENNSYLVANIA, ASSIGNOR TO PEARCE ARROW TIRE AND RUBBER MANUFACTURING COMPANY, OF PHILADELPHIA, PENNSYLVANIA.

PNEUMATIC TIRE.

1,159,864.  Specification of Letters Patent. Patented Nov. 9, 1915.

Application filed January 21, 1915. Serial No. 3,458.

*To all whom it may concern:*

Be it known that I, ABRAHAM LINCOLN PEARCE, a citizen of the United States, residing at Philadelphia, in the county of Philadelphia and State of Pennsylvania, have invented certain new and useful Improvements in Pneumatic Tires, of which the following is a specification.

My invention relates to improvements in pneumatic tires, the object of the invention being to provide a pneumatic tire or rather an outer wearing shoe for pneumatic tires with a large number of thicknesses of reinforcing canvas and interposed between sections of canvas layers or thicknesses of soft rubber or gum, vulcanizing the entire mass together.

A further object is to provide a shoe of the character stated in which a plurality of beads, separated from each other, are provided at the edges of the shoe, permitting a certain amount of independent movement, and thereby allowing tires of a maximum strength and durability to be built up by the employment of an indefinite number of reinforcing thicknesses of canvas or the like.

Heretofore, in the manufacture of tires, and especially with respect to those designed for heavy work, a limit is soon reached in the number of thicknesses of canvas reinforcing strips because of the fact that tne tire, when provided with a number of such reinforcing canvas strips, becomes hard and not only prevents flexibility and elasticity, but is readily broken when sudden jars and jolts come upon the tire.

It is the purpose of my invention to so construct the tire, or rather the shoe, as to permit any number of such thicknesses of reinforcing strips as may be desired to properly stand up under the work necessary for the tire, and without impairing the flexibility or elasticity, but permit the tire its necessary function of cushioning the load.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements, and Fig. 2 is a view in transverse section on an enlarged scale on the line 2—2 of Fig. 1.

1 represents my improved tire shoe which may be of any desired shape and armored in any desired manner in accordance with the use to which it is to be put. The shoe is composed of rubber or composition having a plurality of embedded canvas strips 2, and at suitable intervals the shoe is provided with thicknesses 3 of soft rubber such as ordinary Para rubber or gum. These thicknesses 3 of soft rubber are spaced apart with respect to the number of canvas strips. In some tires, it may be necessary to use only one thickness of soft rubber, in others two, and so on, hence I do not limit myself to the number or to the arrangement of such thicknesses of soft rubber except that the shoe, as an entirety, is vulcanized together and the soft rubber thicknesses become an integral part of the structure.

Instead of providing an ordinary single bead at each side of the shoe, I provide a plurality of beads 4 spaced apart as shown at 5. It will be noted that the space between the beads registers with a thickness of soft rubber 3, so that the movement permitted by the spaced beads is cared for by the soft rubber thickness.

While I have illustrated the space between the beads as of a width or length corresponding to the depth of the bead, it is to be understood that the space might be of any desired length in accordance with the flexibility or movement desired. The shoe is to be used in connection with any ordinary style of rim, and while I have shown the beads of a particular shape, I would have it understood that the invention is not limited thereby.

The beads 4 are reinforced by a filling composition of hard rubber 6 or other suitable material, designed to maintain the shape, and while the movement of the sections of the tire at the bead is very slight, it is sufficient to prevent any cracking or breaking of the tire due to the employment of a large number of canvas reinforcing strips.

While I have referred to the reinforcing strips 2 as of canvas, I would have it understood that I am not limited to the use of this particular material, but consider myself at liberty to utilize my improvements in connection with any material which can be used for the purpose.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A tire shoe having a plurality of beads at both sides thereof, and thicknesses of soft rubber in the tire adjacent the spaces between the beads, substantially as described.

2. A tire shoe having a plurality of beads at both sides thereof, said beads at both sides normally spaced apart, and capable of independent movement, and thicknesses of soft rubber in the tire adjacent the spaces between the beads, substantially as described.

3. A tire shoe having a plurality of beads at both sides thereof, and a thickness of soft rubber vulcanized in the tire and at its edges communicating with the spaces between the beads, substantially as described.

4. A tire shoe having a plurality of beads at both sides thereof, said beads at both sides normally spaced apart, and capable of independent movement, and a thickness of soft rubber vulcanized in the tire and at its edges communicating with the spaces between the beads, substantially as described.

In testimony whereof I have signed my name to this specification in the presence of two subscribing witnesses.

ABRAHAM LINCOLN PEARCE.

Witnesses:
C. R. ZIEGLER,
CHAS. E. POTTS.

Copies of this patent may be obtained for five cents each, by addressing the "Commissioner of Patents, Washington, D. C."